US008147319B2

(12) United States Patent
Hornik et al.

(10) Patent No.: US 8,147,319 B2
(45) Date of Patent: Apr. 3, 2012

(54) WAGERING GAME WITH PARLAY FEATURE FOR WINNING PAYOUTS

(75) Inventors: Jeremy M. Hornik, Chicago, IL (US); Dion K. Aoki, Henderson, NV (US); Joel R. Jaffe, Glenview, IL (US); James J. Poole, Giles (GB); Allon G. Englman, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 1447 days.

(21) Appl. No.: 11/352,903

(22) Filed: Feb. 13, 2006

(65) Prior Publication Data

US 2007/0254733 A1 Nov. 1, 2007

Related U.S. Application Data

(60) Provisional application No. 60/652,286, filed on Feb. 11, 2005.

(51) Int. Cl.
*A63F 13/00* (2006.01)

(52) U.S. Cl. ................ 463/25; 463/16; 463/17; 463/18; 463/19; 463/20; 463/26; 463/27; 463/40; 463/42; 463/43

(58) Field of Classification Search .............. 463/16–22, 463/40–43, 25–30
See application file for complete search history.

(56) References Cited

U.S. PATENT DOCUMENTS

| | | | | |
|---|---|---|---|---|
| 4,752,068 A | | 6/1988 | Endo | 273/1 E |
| 5,575,474 A | | 11/1996 | Rossides | 463/26 |
| 5,609,525 A | | 3/1997 | Ohno et al. | 463/43 |
| 5,833,537 A | | 11/1998 | Barrie | 463/21 |
| 5,957,775 A | | 9/1999 | Cherry | 463/16 |
| 5,997,401 A | * | 12/1999 | Crawford | 463/20 |
| 6,004,211 A | | 12/1999 | Brenner et al. | 463/40 |
| 6,012,983 A | | 1/2000 | Walker et al. | 463/20 |
| 6,077,163 A | | 6/2000 | Walker et al. | 463/26 |
| 6,113,098 A | | 9/2000 | Adams | 273/143 R |
| 6,165,071 A | | 12/2000 | Weiss | 463/24 |
| 6,234,896 B1 | | 5/2001 | Walker et al. | 463/16 |
| 6,270,412 B1 | * | 8/2001 | Crawford et al. | 463/20 |
| 6,273,820 B1 | | 8/2001 | Haste, III | 463/40 |
| 6,319,127 B1 | | 11/2001 | Walker et al. | 463/26 |

(Continued)

FOREIGN PATENT DOCUMENTS

GB 2 114 347 A 8/1983

(Continued)

OTHER PUBLICATIONS

Article for "Parlay Poker", Author Unknown, Strictly Slots, p. 69 (Nov. 2003).

*Primary Examiner* — Sunit Pandya
(74) *Attorney, Agent, or Firm* — Nixon Peabody LLP

(57) ABSTRACT

The present invention is directed to a gaming terminal and a method of playing a wagering game having a parlay feature. Using the parlay feature, a player can place a wager that is greater than a maximum wager allowed at the gaming terminal. In addition, the parlay feature allows a player to wager a portion of the player's prior winnings, instead of the entire amount. Furthermore, the parlay feature can be saved and used in a later gaming session at the same or different gaming terminal.

27 Claims, 7 Drawing Sheets

U.S. PATENT DOCUMENTS

| | | | | |
|---|---|---|---|---|
| 6,364,765 | B1 | 4/2002 | Walker et al. | 463/16 |
| 6,365,765 | B1 | 4/2002 | Baldwin et al. | 556/440 |
| 6,431,983 | B2 | 8/2002 | Acres | 463/25 |
| 6,443,456 | B1 | 9/2002 | Gajor | 273/303 |
| 6,488,281 | B2 | 12/2002 | Stupak | 273/138.1 |
| 6,656,047 | B1 * | 12/2003 | Tarantino et al. | 463/22 |
| 6,688,978 | B1 | 2/2004 | Herman | 463/25 |
| 6,692,003 | B2 | 2/2004 | Potter et al. | 273/274 |
| 6,722,978 | B2 | 4/2004 | Valenti | 463/18 |
| 6,755,420 | B2 | 6/2004 | Colton | 273/274 |
| 6,758,757 | B2 | 7/2004 | Luciano, Jr. et al. | 463/43 |
| 6,776,713 | B2 | 8/2004 | Gauselmann | 463/16 |
| 6,783,456 | B2 | 8/2004 | White | 463/18 |
| 6,800,027 | B2 | 10/2004 | Giobbi et al. | 463/24 |
| 6,811,486 | B1 | 11/2004 | Luciano, Jr. et al. | 463/24 |
| 6,830,514 | B2 | 12/2004 | Meyer et al. | 463/17 |
| 6,910,965 | B2 | 6/2005 | Downes | 463/28 |
| 6,913,531 | B1 | 7/2005 | Yoseloff | 463/13 |
| 6,923,721 | B2 | 8/2005 | Luciano et al. | 463/24 |
| 2001/0046893 | A1 | 11/2001 | Giobbi et al. | 463/24 |
| 2002/0061019 | A1 | 5/2002 | Strachan | 370/389 |
| 2002/0068633 | A1 | 6/2002 | Schlaifer | 463/43 |
| 2002/0077174 | A1 | 6/2002 | Luciano et al. | 463/25 |
| 2002/0093136 | A1 | 7/2002 | Moody | 273/139 |
| 2002/0107065 | A1 | 8/2002 | Rowe | 463/20 |
| 2002/0113367 | A1 | 8/2002 | Stupak | 273/138.1 |
| 2003/0003981 | A1 | 1/2003 | Valenti | 463/16 |
| 2003/0013515 | A1 | 1/2003 | Rowe et al. | 463/25 |
| 2003/0013531 | A1 | 1/2003 | Rowe et al. | 463/42 |
| 2003/0036427 | A1 | 2/2003 | Brandstetter et al. | 463/29 |
| 2003/0067116 | A1 | 4/2003 | Colton | 273/274 |
| 2003/0078101 | A1 | 4/2003 | Schneider et al. | 463/42 |
| 2003/0100362 | A1 | 5/2003 | Horniak et al. | 463/25 |
| 2003/0114210 | A1 | 6/2003 | Meyer et al. | 463/17 |
| 2003/0114211 | A1 | 6/2003 | White | 463/17 |
| 2003/0114219 | A1 | 6/2003 | McClintic | 463/25 |
| 2003/0157979 | A1 | 8/2003 | Cannon et al. | 463/16 |
| 2003/0199315 | A1 | 10/2003 | Downes | 463/28 |
| 2003/0220138 | A1 * | 11/2003 | Walker et al. | 463/25 |
| 2004/0017043 | A1 | 1/2004 | Moody | 273/292 |
| 2004/0137978 | A1 | 7/2004 | Cole et al. | 463/16 |
| 2004/0142742 | A1 | 7/2004 | Schneider et al. | 463/25 |
| 2004/0185933 | A1 | 9/2004 | Nicely | 463/25 |
| 2004/0204213 | A1 | 10/2004 | Schugar et al. | 463/6 |
| 2004/0204217 | A1 | 10/2004 | Herman | 463/16 |
| 2004/0210507 | A1 | 10/2004 | Asher et al. | 705/37 |
| 2005/0027643 | A1 | 2/2005 | Amaitis et al. | 705/37 |
| 2005/0032565 | A1 | 2/2005 | Cheng et al. | 463/16 |
| 2005/0051963 | A1 | 3/2005 | Snow | 273/292 |
| 2005/0086143 | A1 | 4/2005 | Vlazny et al. | 705/35 |
| 2005/0110215 | A1 | 5/2005 | Jackson | 273/292 |
| 2005/0181869 | A1 | 8/2005 | Downes | 463/28 |
| 2005/0208996 | A1 | 9/2005 | Friedman | 463/25 |
| 2005/0285336 | A1 | 12/2005 | Ilievski | 273/143 R |
| 2006/0247028 | A1 * | 11/2006 | Brosnan et al. | 463/25 |
| 2007/0254733 | A1 * | 11/2007 | Hornik et al. | 463/20 |
| 2007/0298860 | A1 * | 12/2007 | Graves et al. | 463/20 |

FOREIGN PATENT DOCUMENTS

| | | | | |
|---|---|---|---|---|
| GB | 2114347 | A | * | 8/1983 |
| GB | 2 153 572 | A | | 8/1985 |
| GB | 2 214 389 | A | | 8/1989 |
| GB | 2 383 175 | A | | 6/2003 |
| WO | WO 99/29381 | | | 6/1999 |

* cited by examiner

WAGERING GAME WITH PARLAY FEATURE FOR WINNING PAYOUTS

CROSS REFERENCE TO RELATED APPLICATION

This application claims the benefit of priority of U.S. Provisional Patent Application No. 60/652,286, filed Feb. 11, 2005, which is hereby incorporated by reference in its entirety.

FIELD OF THE INVENTION

The present invention relates generally to gaming terminals and methods of playing wagering games at the gaming terminals, and more particularly, to a gaming terminal having a wagering game with a parlay feature that allows players to wager a portion of a winning payout in a subsequent wagering game that is greater than the maximum wager allowed at the gaming terminal.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to continuously develop new games and improved gaming enhancements that will attract frequent play through enhanced entertainment value to the player.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a such faster rate, which leads to further player excitement.

In addition to the features described above, some current wagering games allow players to immediately parlay their winnings from a previous game. Typically, such wagering games have the limitation that the players must wager all of their prior winnings to take advantage of the parlay feature. Additionally, these wagering games also require that the players must wager all of their prior winnings in a wagering game that is played immediately after receiving the winnings (e.g., a double-or-nothing wagering feature after the player has achieved a winning combination). Furthermore, to date, these parlay features have been used with wagering games such as "Video Blackjack" and have not been used with slot machines. Because slot machines typically have a maximum wager amount that can be placed for each payline of the wagering game, a player cannot place a wager that exceeds the maximum payline bet.

The present invention is intended to overcome the above-mentioned limitations by providing a gaming machine having an enhanced parlay feature that offers a player more flexibility and control over his or her wagering options and thus increases the level of excitement and anticipation associated with playing wagering games at gaming terminals, particularly slot machines.

SUMMARY OF THE INVENTION

The present invention provides a wagering game with a parlay feature that allows players to wager less than all of their winnings, but more than a maximum payline bet, at a slot machine. Moreover, players are allowed to save their winnings to be used with the parlay feature for use in subsequent gaming sessions. Consequently, players are more likely to gamble at machines having the parlay feature that allow them to wager only a portion of their winnings and allow them to carry those winnings over to future gaming sessions. Additionally, slot machines with a parlay feature are more attractive to players because they are able to wager amounts that are greater than the maximum payline bet and are thus able to win larger credit awards.

In one aspect of the present invention, a gaming terminal for playing a wagering game comprises a display for displaying a plurality of symbols that indicate a randomly selected outcome of the wagering game that has been selected from a plurality of outcomes in response to receiving a wager input. The wager input is equal to or less than a maximum wager allowed at the gaming terminal. At least one of the outcomes includes a winning outcome that provides an award. The gaming terminal also includes a parlay feature for placing a subsequent wager input that is equal to a portion of the award. The subsequent wager is greater than the maximum wager allowed at the gaming terminal. The parlay feature can be saved by a player for use at a later play at a later gaming session.

In another aspect of the present invention, a method of playing a wagering game at a gaming terminal is disclosed. The wagering game has a plurality of symbols that indicate a randomly selected outcome of the wagering game that has been selected from a plurality of outcomes. The method comprises receiving a wager input from a player at the gaming terminal and conducting the wagering game. The method further comprises achieving a winning outcome associated with the wager input, awarding an award based on the winning outcome, and providing an option to the player for selectively placing a subsequent wager input that is equal to a first portion of the award via a parlay feature. The subsequent wager input is greater than a maximum wager allowed at the gaming terminal.

In an alternative aspect of the present invention, a gaming terminal for playing a wagering game is disclosed. The wagering game has a maximum wager amount that a player can wager on each game with credits that have been placed in the gaming terminal by the player. The gaming terminal includes a display for displaying a plurality of symbols that indicate a randomly selected outcome of the wagering game that has been selected from a plurality of outcomes. The gaming terminal also includes a controller that is coupled to the display that operatives to conduct the wagering game. The wagering game has a parlay feature that allows the player to selectively place a wager input that is equal to at least a portion of prior winnings of the player and that is greater than the maximum wager amount for the gaming terminal.

In an alternative aspect of the present invention, a method for conducting a wagering game includes receiving a wager input and conducting the wagering game having a parlay feature at a gaming terminal. The method includes displaying a combination of symbols that indicate a winning outcome of the wagering game and providing an award of credits associated with the winning outcome that is credited to the parlay feature. The method also includes placing a subsequent wager input using the parlay feature that is equal to a first portion of the award of credits and that is more than a maximum wager allowed at the gaming terminal. The method further includes saving a second portion of the award of credits for use in a subsequent gaming session. The second portion is capable of being used for wager inputs at a gaming terminal used for the subsequent gaming session.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
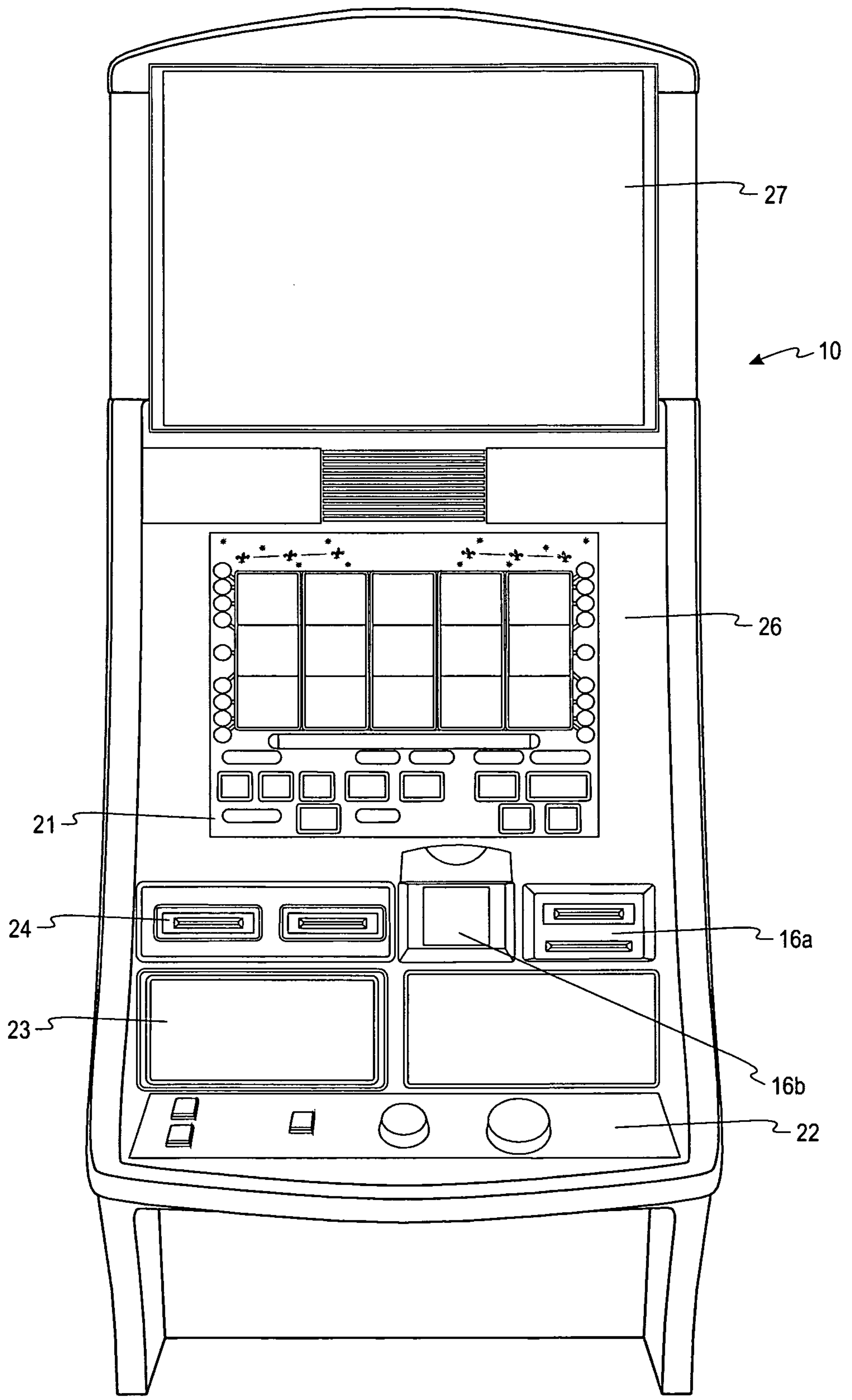
FIG. 1 is a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present invention is directed to a gaming terminal and a method of playing a wagering game having a parlay feature. Specifically, the parlay feature allows a player to wager prior winnings in a subsequent game or in a subsequent gaming session. A player can wager a portion of his or her prior winnings and can save the winnings for use in a later gaming session using the parlay feature. The wager amounts may be greater than the maximum payline bet that is allowed at a particular gaming terminal.

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor **16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, information about a bonus game, and/or also possibly game-related information or other entertainment features. While these typical components found in the gaming terminal 10** are described below, it should be understood that numerous other elements may exist and may be used in any number of combinations to create various forms of a gaming terminal.

The wager acceptor 16 may be provided in many forms, individually or in combination. The card wager acceptor **16*a* may include a card-reading device for reading a card that has a recorded monetary value with which it is associated. The card wager acceptor 16*a* may also receive a card that authorizes access to a central account, which can transfer money to the gaming terminal 10. The cash wager acceptor 16*b* may include a coin slot acceptor or a note acceptor to input value to the gaming terminal 10**.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire display (or a portion thereof) to allow players to make game-related selections. Alternatively, the gaming terminal 10 may have a number of mechanical reels to display the game outcome, as well. The secondary display 27 may display information relating to the basic wagering game or a bonus game. Like the main display 26, the secondary display 27 may take the form of a cathode ray tube (CRT), a high resolution LCD, a plasma display, LED, or any other type of video display suitable for use in the gaming terminal 10.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
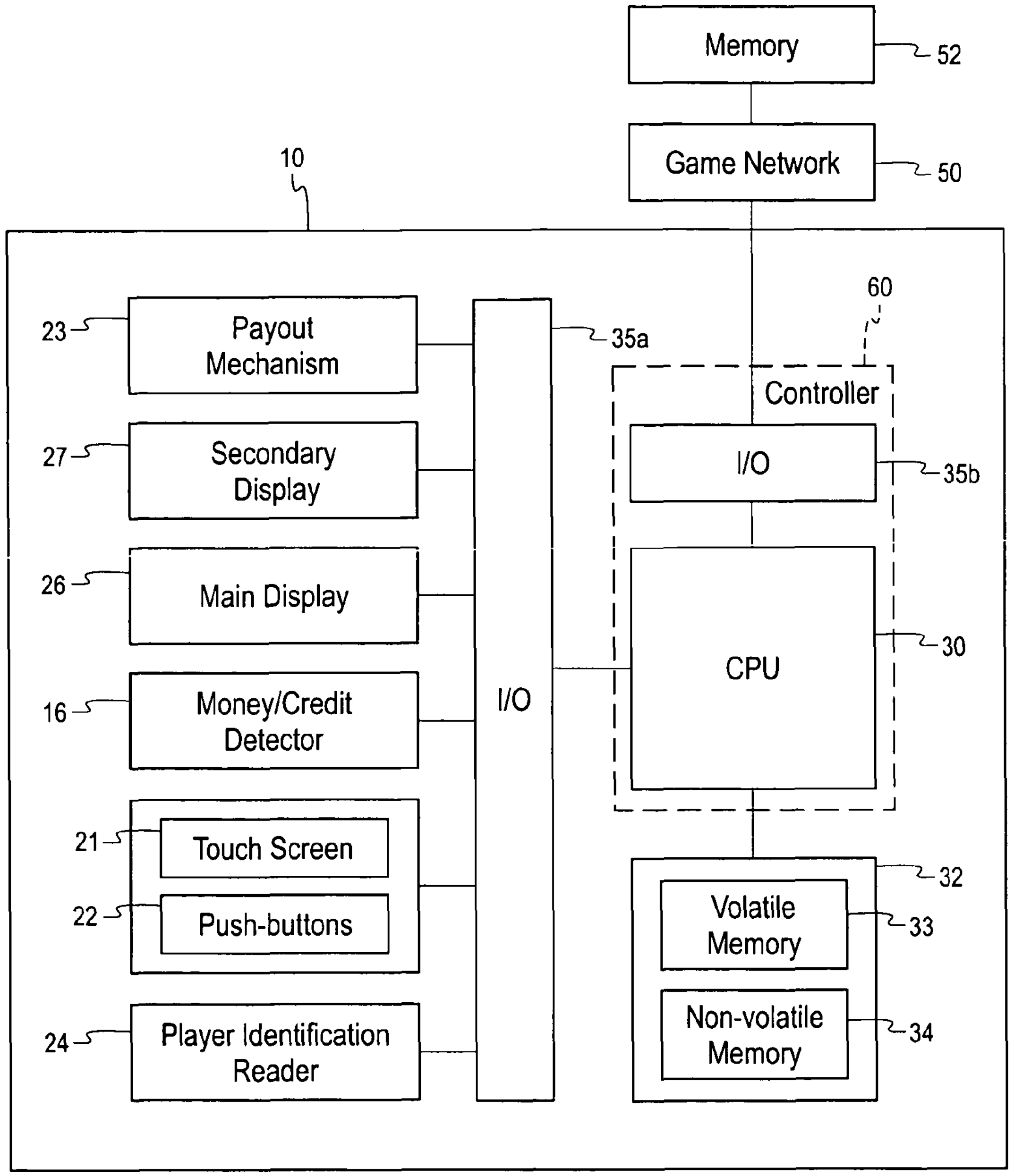
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 (FIG. 2) and may be used to control numerous gaming terminals 10. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing at one gaming terminal 10 at a different gaming terminal that is also part of the game network. Assets may be any number of things, including, but not limited to, monetary or non-monetary awards, features that a player builds up in a bonus or progressive game to win awards, etc. Monetary awards can include game credits or money, including game credits or money that are used in a parlay feature. Non-monetary awards can be free plays (e.g., free spins), extended game play, multipliers, access to bonus and/or progressive games, or any such assets that allow players to receive additional or bonus awards, such as cards, dice, tokens, etc.

In some embodiments, the CPU 30 is used with the information reader 24 to restore saved assets. For example, in one embodiment, the information reader 24 is adapted to receive and distribute tickets. The tickets each include a unique identifier. The unique identifier links the ticket to a file contained within the local memory 32 or a system memory 52 located in the game network 50. The file includes assets that are being stored from a previous game, i.e., credits earned for a parlay feature.

When a player inserts a ticket into the information reader 24, the CPU 30 obtains the unique identifier and causes the appropriate memory 32, 52 to be searched, and the file containing the unique identifier matching the identifier on the ticket is retrieved. Any assets or other information contained in this file are then transmitted to the gaming terminal 10, and the player regains any assets that were saved during a previous game. This allows the player to keep assets even after a particular gaming session ends, which increases player commitment to a game and decreases vulturing (and possibly even ends it).

In other embodiments, the information reader 24 may include a card reader, and the unique identifier provided at the gaming terminal 10 may be stored on a personal identification card. Or, the gaming terminal 10 may include a radio frequency identification device (RFID) transceiver or receiver so that an RFID transponder held by the player can be used to provide the unique identifier of the player at the gaming terminal 10 without the need to insert a card into the gaming terminal 10. RFID components can be those available from Pacific Northwest National Laboratory (under the United States Department of Energy) of Richland, Wash.

In some embodiments, the RFID may be embedded in a sticker that is placed on a card, such as a personal identification card, that can be inserted into the information reader 24. Alternatively, the RFID may be embedded in a gaming token. The gaming token may be plastic, metal or a combination thereof. The gaming token may be inserted into the wager accepter 16 or any other device that is capable of reading the RFID and identifying assets that a player has collected. The token may have certain features, some visible to the player and some not visible to the player, that relate to the wagering game.

In other embodiments, the information reader 24 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming terminal so that the player can be recognized using a voice recognition system.

In other embodiments, the player may simply have to enter in a unique identification code and password into the gaming terminal 10. In these embodiments, the player would not have to insert a physical object (such as a card or ticket) into the gaming terminal, but would instead use the information reader 24 as an input device, such as a keyboard.

In summary, there are many techniques in which to provide a unique identifier for the player so that the assets accumulated by the player during one wagering session can be stored in either the system memory 52 or local memory 32, thereby allowing the player to subsequently access those assets at the same gaming terminal 10 or a different gaming terminal within the network 50. In this manner, various assets related to the wagering game features and formats can be stored after one gaming session and used in a subsequent gaming session (s) to enhance the gaming experience for the player. In particular, credits associated with a parlay feature may be saved and retrieved to use as future parlay wagers.

As has been discussed, the gaming terminal 10 and/or associated gaming network 50 is capable of executing such wagering games on or through a controller 60. Controller 60, as used herein, comprises any combination of hardware, software, and/or firmware that may be disposed or resident inside and/or outside of a gaming terminal 10 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least one other processing device. The controller 60 may comprise the I/O circuits 35*a* and 35*b* and the CPU 30. In other embodiments, the CPU 30 may be housed outside of the controller 60 and a different processor may be housed within the controller 60. The controller 60, as used herein, may comprise one or more controllers. In one implementation, each gaming terminal 10 comprises, or is connected to, a controller 60 enabling each gaming terminal 10 to transmit and/or receive signals, preferably both, in a peer-to-peer arrangement. In another example, the controller 60 may be adapted to facilitate communication and/or data transfer for one or more gaming terminals 10 in a client/server or centralized arrangement. In one aspect, shown in FIG. 2, the controller 60 may connect the gaming terminal 10 via a conventional I/O port and communication path (e.g. serial, parallel, IR, RC, 10 bT, etc.) to the game network 50, which may include, for example, other gaming terminals connected together in the network 50.

Figure 3:
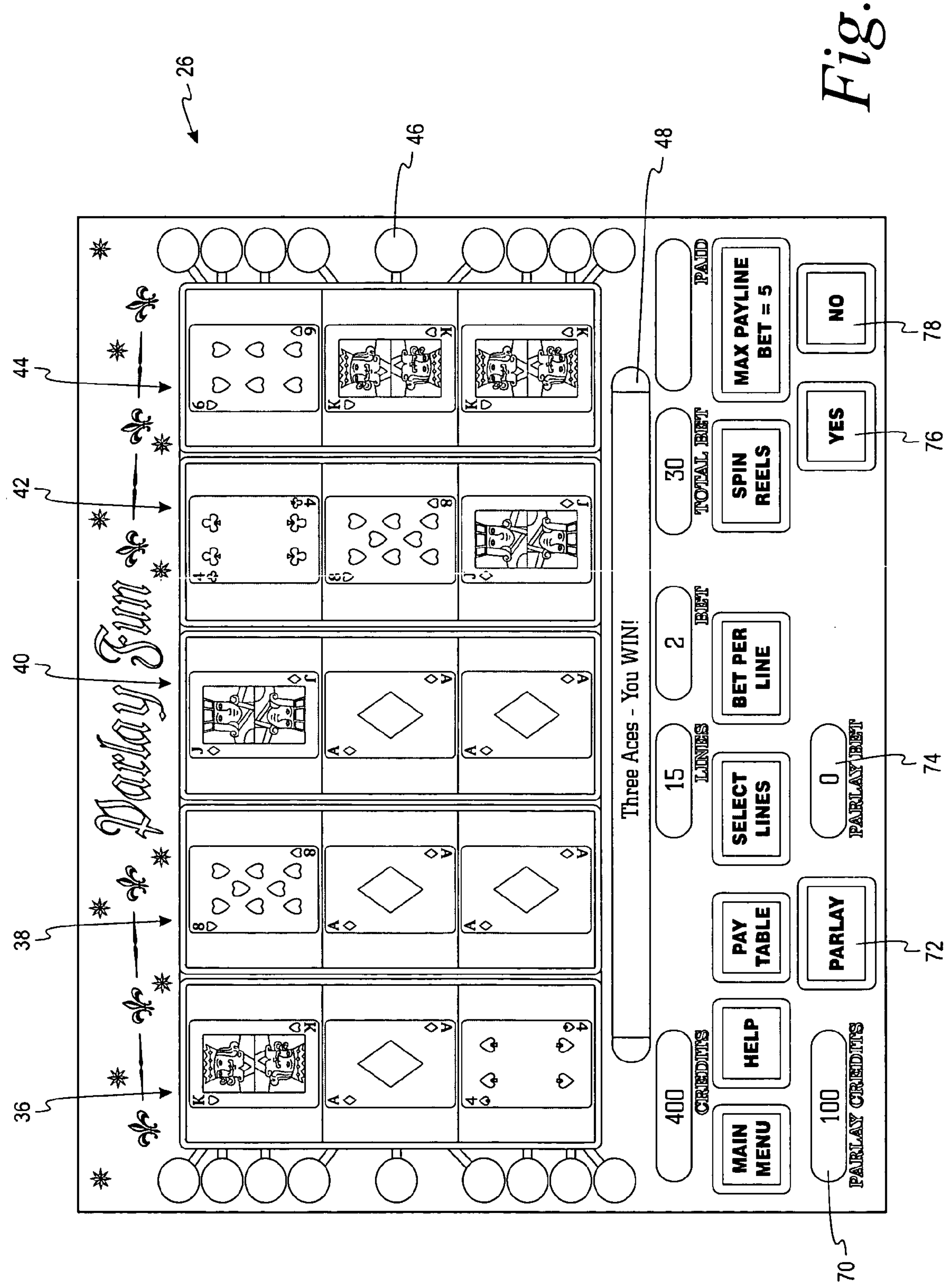
FIG. 3 illustrates a main display according to one embodiment of the present invention.

The main display 26 of one embodiment of the present invention is shown in more detail in FIG. 3. In this embodiment, the basic wagering game is a slot machine game, with symbols on five different reels 36, 38, 40, 42, 44. The reels 36-44 may be either traditional mechanical reels or they may be computer-generated images of reels, with each reel composed of a plurality of symbols. Upon receiving a wager input, the payline indicators 46 indicate a randomly selected outcome from a plurality of outcomes for each payline, which is the combination of symbols on the reels 36-44. Thereafter, an outcome indicator 48 indicates whether the outcome has resulted in a winning outcome or a non-winning outcome. While multiple paylines are shown, a gaming terminal 10 with a single payline will also work with the present invention.

The main display 26 contains a parlay meter 70. The parlay meter 70 displays an amount of parlay credits that are available to the player. As shown in FIG. 3, "100 credits" are displayed in the parlay meter 70. The parlay credits are collected from prior winnings and are credited to the parlay meter 70 for use in future wager inputs. The main display 26 of FIG. 3 also displays a "parlay" button 72 and a "parlay bet" 74 features. A player may use these features located on the touch screen 21 for placing a wager using the parlay credits. While illustrated as buttons on the touch screen 21, these features may also be located on the push-button panel 22.

Figure 4:
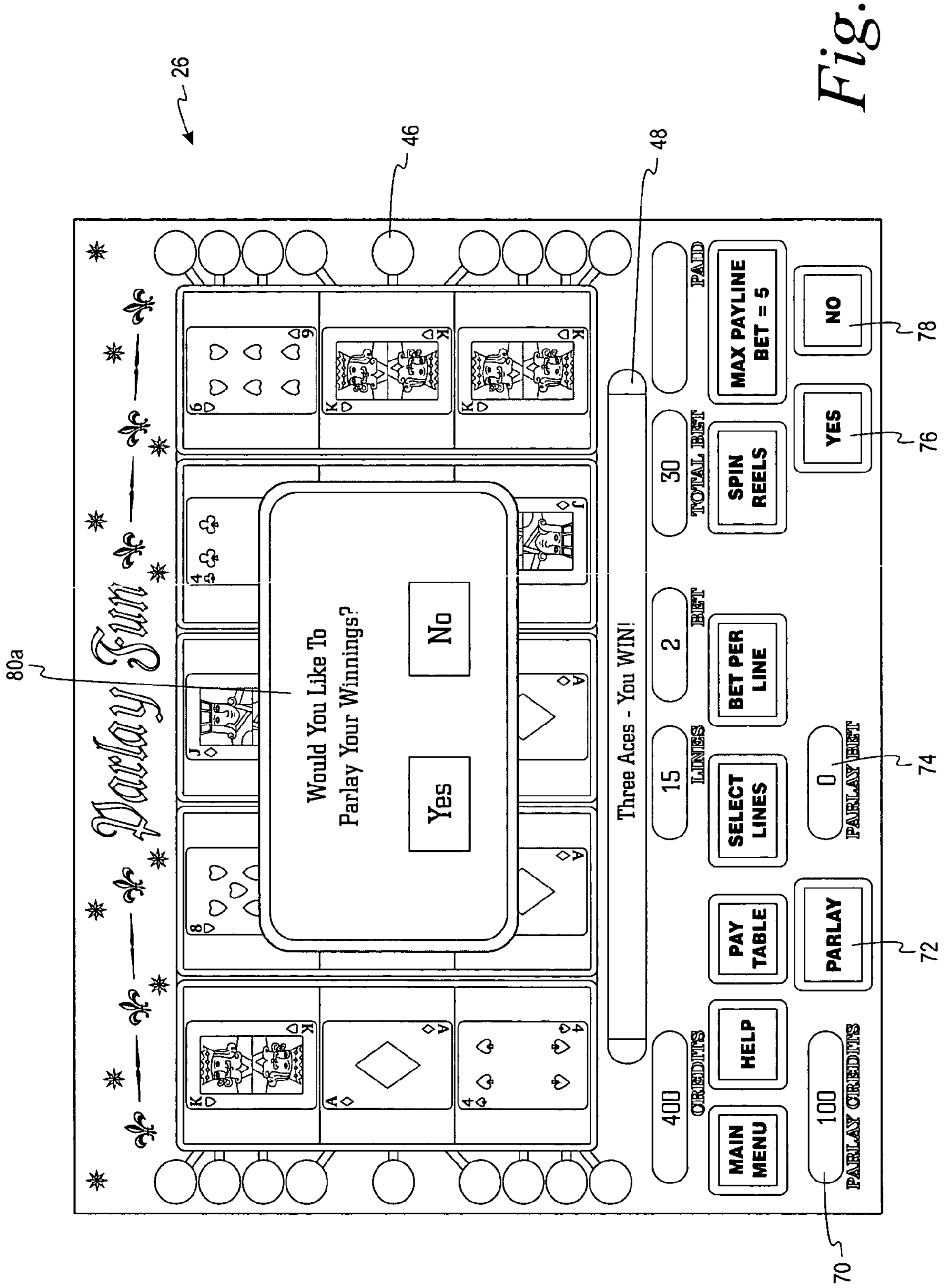
FIG. 4 illustrates a main display inviting a player to use a parlay feature according to one embodiment of the present invention.

According to one embodiment of the present invention, after a player places a wager and achieves a winning outcome in the basic game, the player can choose to place the credits in the parlay meter 70. For example, FIG. 4 displays a window 80*a* that asks the player "Would You Like To Parlay Your Winnings?" The player is then given the option of using the parlay credits earned from the prior winning outcome as a wager input in the next wagering game. At this point, the player can select either "YES" or "NO" using the player-selectable buttons 76, 78. If the player selects "Yes," the player may be prompted with a follow-up window 80*b* that asks "How Much Would You Like To Bet?" (FIG. 5).

Figure 5:
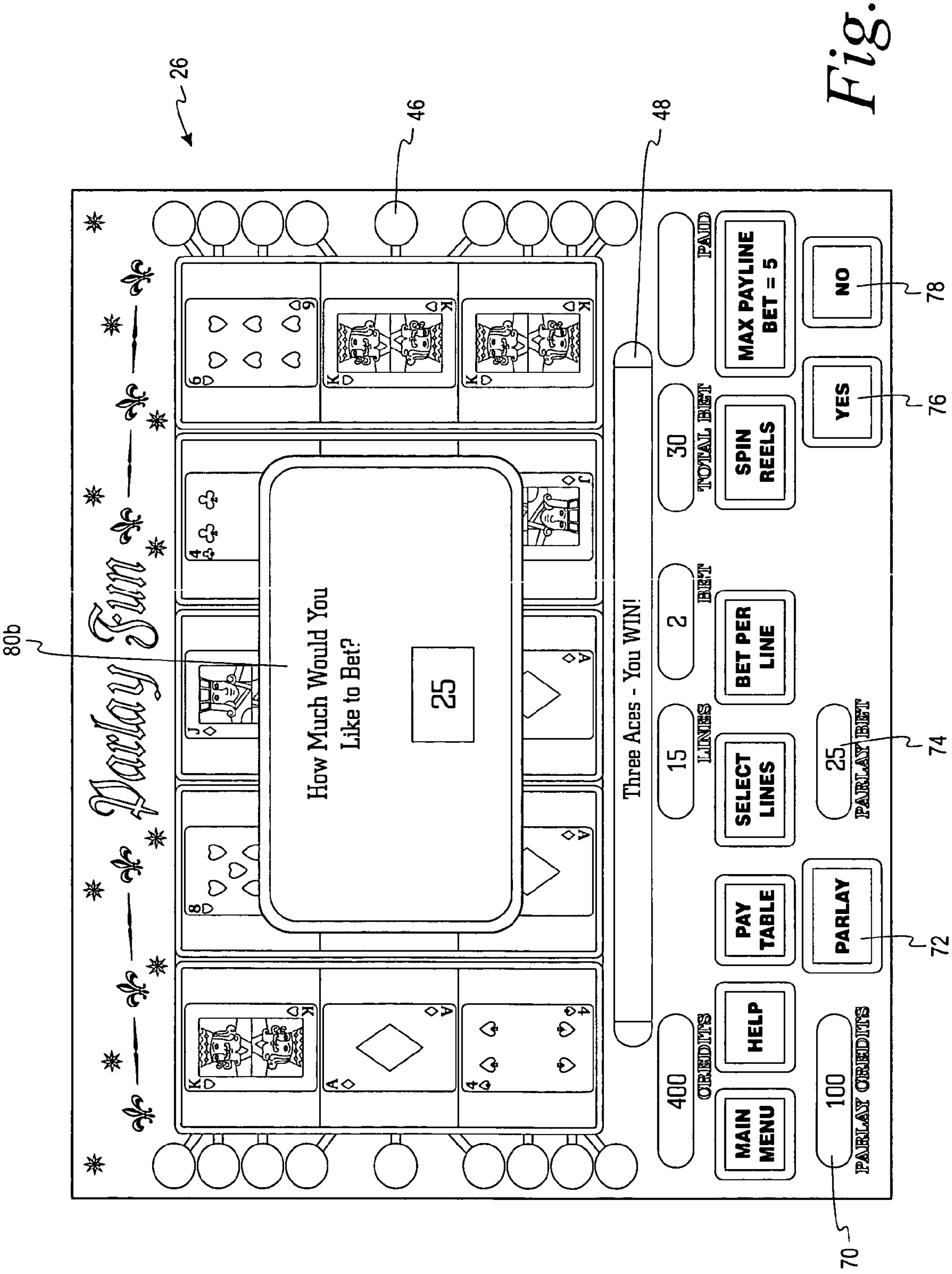
FIG. 5 illustrates a main display requesting a selection of a parlay amount according to one embodiment of the present invention.
Figure 6:
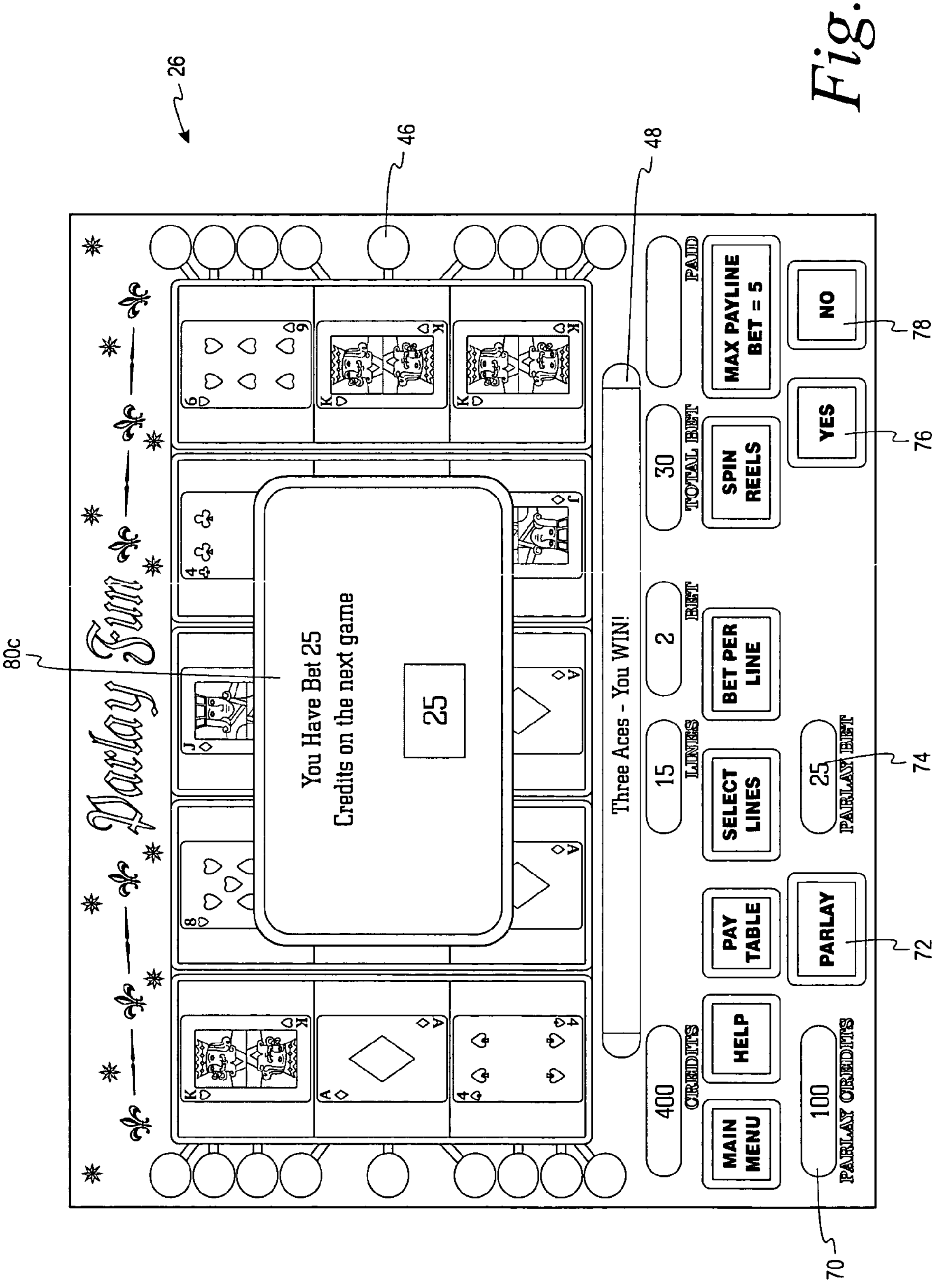
FIG. 6 illustrates a main display confirming a parlay feature selection according to one embodiment of the present invention.

At this point, as shown in FIG. 5, a player may select to wager all or a portion of the parlay credits displayed in the parlay meter 70. This wager can be more than a player would be allowed to wager if he or she placed a wager equal to the maximum payline bet allowed, i.e., 5 credits, for the wagering game. In FIG. 6, the player has elected to wager 25 credits, as confirmed in the window 80*c*. Alternatively, the player could selectively wager any amount up to the total amount of parlay credits available, i.e., 100 credits. If a player chooses to wager less than the amount of parlay credits available, the parlay credits not wagered may be saved and the player can elect to use them in a later game or even in a later gaming session. For example, the player may elect to wager 25 credits in each of the next four games or in four games an hour later at a different gaming terminal having the parlay feature.

In some embodiments, the number of parlay credits may be reduced if, for example, a player goes on a losing streak and loses more than the number of non-parlay credits. Using FIG. 5 as an example, a player has a total of 400 credits of which 100 are parlay credits and 300 are non-parlay credits. If a player goes on a losing streak for 320 credits, the number of non-parlay credits would be reduced by 300 (leaving zero non-parlay credits) and the number of parlay credits would be reduced by 20 credits. In this case, the parlay meter would then display 80 parlay credits.

Figure 7:
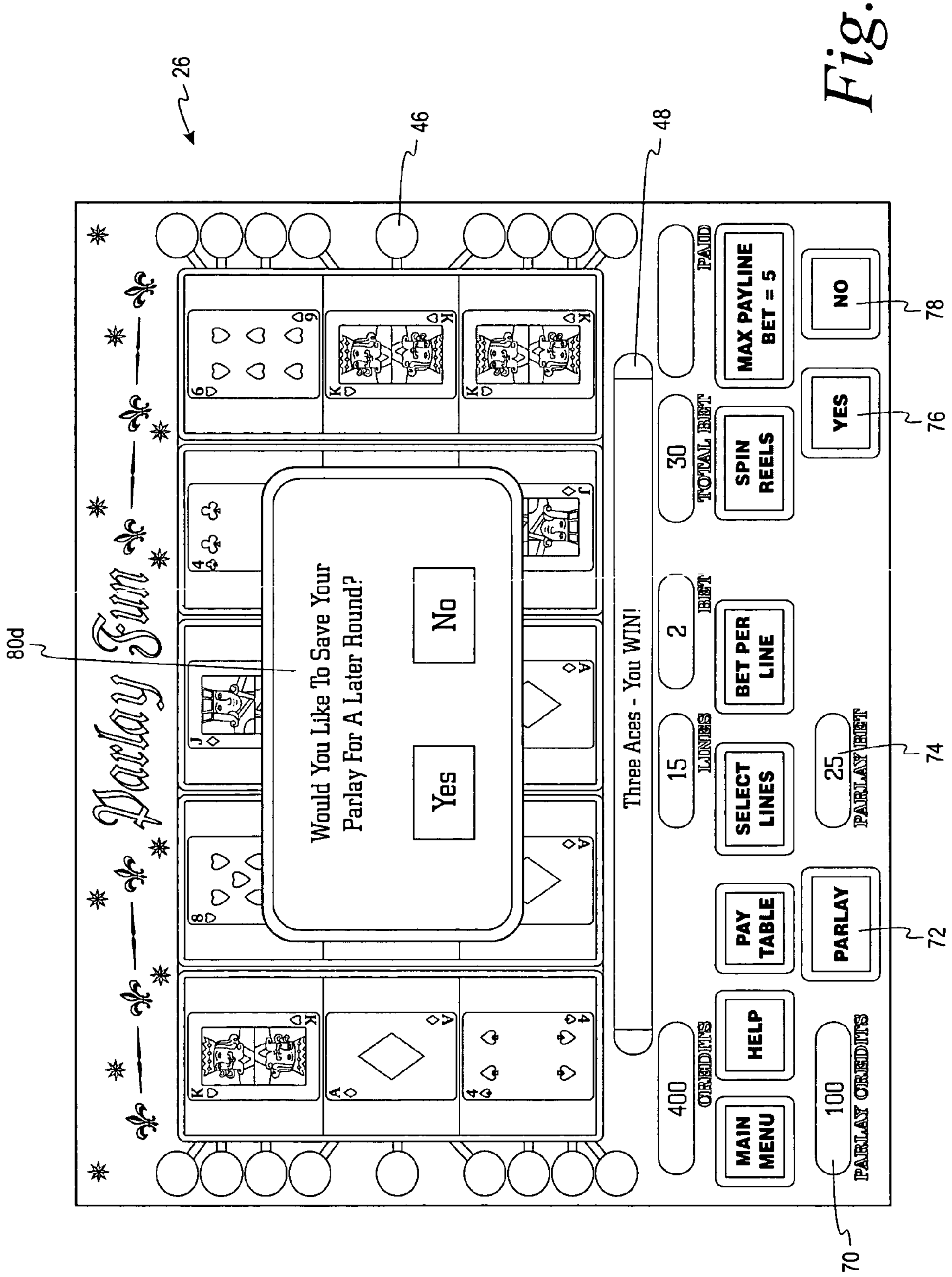
FIG. 7 illustrates a main display inviting a player to use the parlay feature in a later gaming session according to one embodiment of the present invention.

According to the present invention, a player is allowed to wager more than the maximum payline bet using the parlay feature and, consequently, he or she can win larger awards. This increases player excitement and raises the entertainment level of the wagering game. Furthermore, as shown in FIG. 7, a player is also given the option to save the parlay feature for use in later gaming sessions. When the player has chosen to cash out of the gaming terminal 10, the player is prompted to save the prior winnings or a portion of the prior winnings to be used with the parlay feature in a later game with a window 80*d* that asks "Would You Like To Save Your Parlay For A Later Round?" The saved parlay feature is then identified with the player via the CPU 30 and/or the information reader 24 and any of the information-collecting devices described above. The saved parlay feature may be retrieved in a later gaming session at either the same or a different gaming terminal.

In other embodiments, many gaming terminals may be linked together for playing a wagering game that allows players to share parlay features. In these embodiments, the linked gaming terminals may transmit and receive data relating to the parlay feature. The player may choose the gaming terminals with which he or she wishes to link to be able to share his or her parlay credits, or alternatively, the controller may randomly select such terminals. The data that is transmitted and received between the linked gaming terminals may also include other types of assets that have been collected and saved by players at the linked gaming terminals.

In alternative embodiments, a player can use a telephone to access and use one or more of the player's accumulated game assets. For example, using a mobile phone, the player can dial a toll-free phone number to access his or her game assets. A central server associated with the network 50 (FIG. 2) can recognize the player's mobile number for identification purposes, via a caller-id feature, or, alternatively, the central server may require the player to create a unique code number (if, for example, the player uses a caller-id block feature). Optionally, the player may be required to enter an additional code for identifying a specific gaming machine 10.

Thus, the player can use his or her mobile phone to remotely access the wagering game and utilize the accumulated assets at a time and place according to the player's desire. For example, the player can restart a gaming session via the mobile phone at a point where he or she had previously stopped the session, or the player can choose, via the mobile phone, to play an accumulated bonus game that he or she had previously won, but not played.

In another example, the player can put money into a gaming machine 10 while the player is physically at the gaming machine 10. Before the player walks away from the gaming machine 10, the player can register the gaming machine 10 to the player's phone. The player can also let the gaming machine 10 know what assets it may intend to use in the future via remote access by the phone. For example, the player can register the phone number as a password required to access the player's assets on the gaming machine 10. The player can initiate an auto-play feature while at the gaming machine 10 or remotely via the phone. The auto-play feature of the gaming machine 10 is configured to report, e.g., via still or moving images on the phone, one or more of the gaming outcomes. Then, at a later time, the player returns to the gaming machine 10, re-checks into the gaming machine via the phone and, optionally, cashes out any winnings. While no actual gameplay occurs on the phone, the phone is used for accessing the player's assets and gaming outcomes on the gaming machine 10.

Optionally, the wagering game provides the player with access to accumulated assets and/or certain awards only if the player achieves a "Remote Play Winning Outcome." If the player achieves this outcome (e.g., in a basic or bonus game), then he or she is allowed remote access to one or more of the accumulated assets and/or certain awards. For example, if the player achieves the "Remote Play Winning Outcome," the player can have the option to select a smaller award while the player is physically present at the gaming machine 10 or a larger award if the player uses the telephone. In another example, the player may be given the option to play for smaller awards while the player is physically present at the gaming machine 10 or for larger awards if the player uses the telephone for gameplay initiation.

Alternative to using a voice telephone call to initiate a game or to access assets and/or awards, as described above, the player can send a text message. For example, the player can send a special code in the text message to log-in using a special number on the gaming machine 10.

For identification purposes, various verification ways can be used. For example, the player can enter the mobile telephone number into the gaming machine 10 as a player identification number. When the phone is near, the gaming machine 10 can detect it and verify the player identification number, e.g., the mobile number. For example, a receiver can be installed in the gaming machine 10 for detecting a mobile identifier (which may include the mobile number) that is periodically transmitted by mobile phones to the nearest mobile base station. Thus, the gaming machine 10 would have similar capabilities to the mobile base station.

Alternatively, the gaming machine 10 can send a voice or text message to the mobile telephone to verify the player's identification number. For example, the gaming machine 10 can send a text message asking the player to reply to the text message using a predetermined code for confirmation purposes. Optionally, a Bluetooth identifier can be used for logging-in and/or verification purposes, wherein the Bluetooth identifier is unique per phone and/or service carrier.

Special benefits can be offered to a player based on the telephone brand and/or service carrier. For example, predetermined assets can be made available to the player only if they use a telephone of brand X that uses service carrier Y. Optionally, the special benefits can be made available based on the telephone model.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game at a gaming terminal the method comprising: providing a credit meter and a parlay meter;

in response to a wager drawn from the credit meter, initiating the wagering game at the gaming terminal, the wager being less than or equal to a maximum amount exclusive of the parlay meter;

randomly selecting outcomes for a plurality of successive plays of the wagering game;

providing award amounts for winning ones of the randomly selected outcomes;

accumulating at least portions of one or more of the award amounts in the parlay meter such that the parlay meter includes an accumulated award amount exclusive of the credit meter, the accumulating including allowing the player to select any portion of the one or more award amounts to accumulate in the parlay meter; and allowing a player to select any portion of the accumulated award amount in the parlay meter, including a portion greater than the maximum amount, as a wager for a subsequent play of the wagering game.

2. The method of claim 1, wherein the maximum amount is associated with the credit meter, such that the wager drawn from the credit meter cannot exceed the maximum amount for any play of the wagering game.

3. The method of claim 1, further including saving the accumulated award amount in the parlay meter for use in a later gaming session at a second gaming terminal different than the gaming terminal.

4. The method of claim 3, further including identifying the accumulated award amount with the player for use in the later gaming session.

5. The method of claim 1, further including allowing the player to select additional portions of the accumulated award amount in the parlay meter as wagers for subsequent plays of the wagering game.

6. The method of claim 5, further including accumulating portions of award amounts from the subsequent plays in the parlay meter.

7. The method of claim 1, further comprising after allowing the player to select any portion of the accumulated award amount in the parlay meter as a subsequent wager input, maintaining any unselected portion of the accumulated award in the parlay meter.

8. The method of claim 1, wherein the maximum amount is the maximum wager amount that can be placed for all pay-lines combined of the wagering game.

9. The method of claim 1, wherein the maximum amount is the maximum wager allowed at the gaming terminal.

10. The method of claim 1, wherein the maximum amount is the maximum amount that the player can wager on each game with credits placed in the credit meter by the player.

11. The method of claim 1, wherein the maximum amount is a fixed amount determined by the wagering game.

12. A method of conducting a wagering game playable via a gaming terminal, the method comprising: providing the wagering game with a credit meter and a parlay meter distinct from the credit meter;

receiving a number of credits drawn from the credit meter as a wager for playing the wagering game, the number of credits being less than or equal to a maximum amount that is exclusive of the parlay meter;

randomly selecting outcomes for a plurality of successive plays of the wagering game;

providing credit amounts for winning ones of the randomly selected outcomes;

allowing a player to select any portion of one or more of the credit amounts to accumulate in the parlay meter such that the parlay meter includes an accumulated credit amount; and receiving a wager from the player for a subsequent play of the wagering game by allowing the player to select either (i) a number of credits from the credit meter or (ii) any portion of the accumulated credit amount in the parlay meter, including a portion greater than the maximum amount.

13. The method of claim 12, wherein the maximum amount is associated with the credit meter, such that the wager drawn from the credit meter cannot exceed the maximum amount for any play of the wagering game.

14. The method of claim 12, further including saving the accumulated credit amount in the parlay meter for use in a later gaming session at a second gaming terminal different than the gaming terminal.

15. The method of claim 12, wherein upon receiving a wager from a portion of the accumulated credit amount in the parlay meter, keeping any unselected portion of the accumulated credit amount in the parlay meter.

16. The method of claim 12, wherein the subsequent play of the wagering game includes a winning outcome providing an additional credit amount, at least a portion of the additional credit amount being added to the accumulated credit amount in the parlay meter.

17. A gaming system for conducting a wagering game the gaming system comprising: a credit meter and a parlay meter, the wagering game being playable at a gaming terminal in response to a wager drawn from the credit meter, the wager being less than or equal to a maximum amount exclusive of the parlay meter;

a display for displaying randomly selected outcomes for a plurality of successive plays of the wagering game, the randomly selected outcomes providing award amounts for winning ones of the randomly selected outcomes;

a controller for accumulating any portion, selected by a player, of one or more of the award amounts in the parlay meter such that the parlay meter includes an accumulated award amount; and an input device for allowing the player to select any portion of the accumulated award amount in the parlay meter, including a portion greater than the maximum amount, as a wager for a subsequent play of the wagering game.

18. The gaming system of claim 17, wherein the maximum amount is associated with the credit meter, such that the wager drawn from the credit meter cannot exceed the maximum amount for any single play of the wagering game.

19. The gaming system of claim 17, wherein the accumulated award amount is saved in the parlay meter for use in a later gaming session at a second gaming terminal different than the gaming terminal.

20. The gaming system of claim 19, wherein the accumulated award amount is identified with the player for use in the later gaming session.

21. The gaming system of claim 17, wherein the player is allowed to select additional portions of the accumulated award amount in the parlay meter as wagers for subsequent plays of the wagering game.

22. The gaming system of claim 17, wherein any unselected portion of the accumulated award amount remains in the parlay meter.

23. A gaming system for conducting a wagering game playable via a gaming terminal, the gaming system comprising:

a credit meter for receiving credits from a player, a number of the credits being drawn from the credit meter by the player as a wager input to play the wagering game, the number of credits being less than or equal to a maximum amount;

a display for displaying randomly selected outcomes for a plurality of successive plays of the wagering game, the randomly selected outcomes providing credit amounts for winning ones of the randomly selected outcomes;

a parlay meter for receiving any portion, selected by the player, of one or more of the credit amounts for winning ones of the randomly selecting outcomes, the parlay meter having an accumulated credit amount; and an input device for receiving a wager from the player for a subsequent play of the wagering game by allowing the player to select either (i) a number of credits from the credit meter or (ii) any portion of the accumulated credit amount in the parlay meter, including a portion greater than the maximum amount.

24. The gaming system of claim 23, wherein the maximum amount is associated with the credit meter, such that the wager drawn from the credit meter cannot exceed the maximum amount for any play of the wagering game.

25. The gaming system of claim 23, further including a controller for saving the accumulated credit amount in the parlay meter for use in a later gaming session at a second gaming terminal different than the gaming terminal.

26. The gaming system of claim 23, wherein the number of credits is less than or equal to a maximum number of credits, and wherein the selected portion of the accumulated credit amount in the parlay meter is greater than the maximum number of credits.

27. The gaming system of claim 23, wherein upon the player selecting (ii), any unselected portion of the accumulated credit amount remains in the parlay meter.

* * * * *